Nov. 25, 1924.
A. I. SANDBO
1,516,549
WHEEL ALIGNMENT INDICATOR
Filed Aug. 19, 1921     2 Sheets-Sheet 2
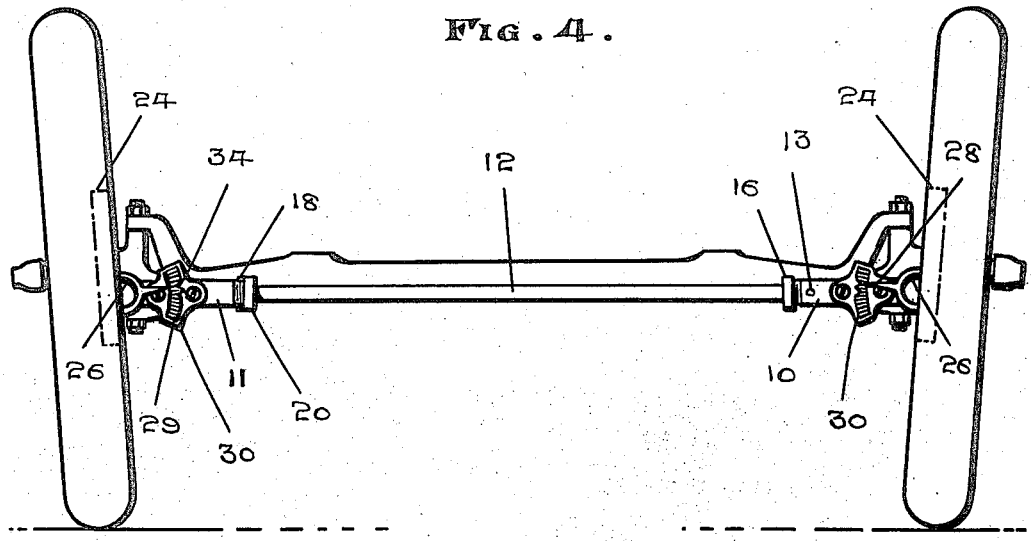
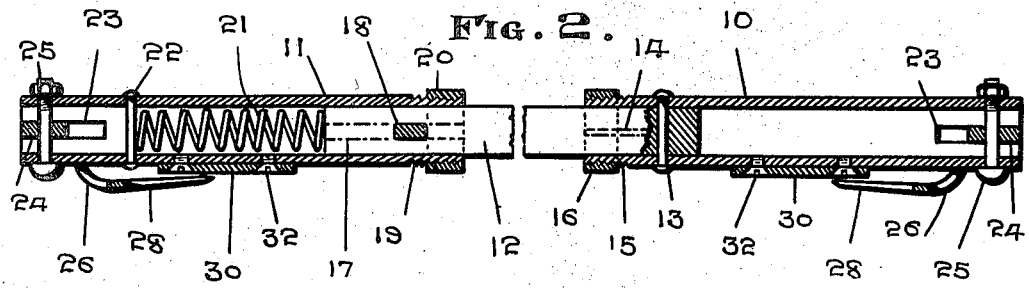
INVENTOR:
ANTON I. SANDBO,
by W. T. Fitz Gerald & Co.
ATTORNEYS.

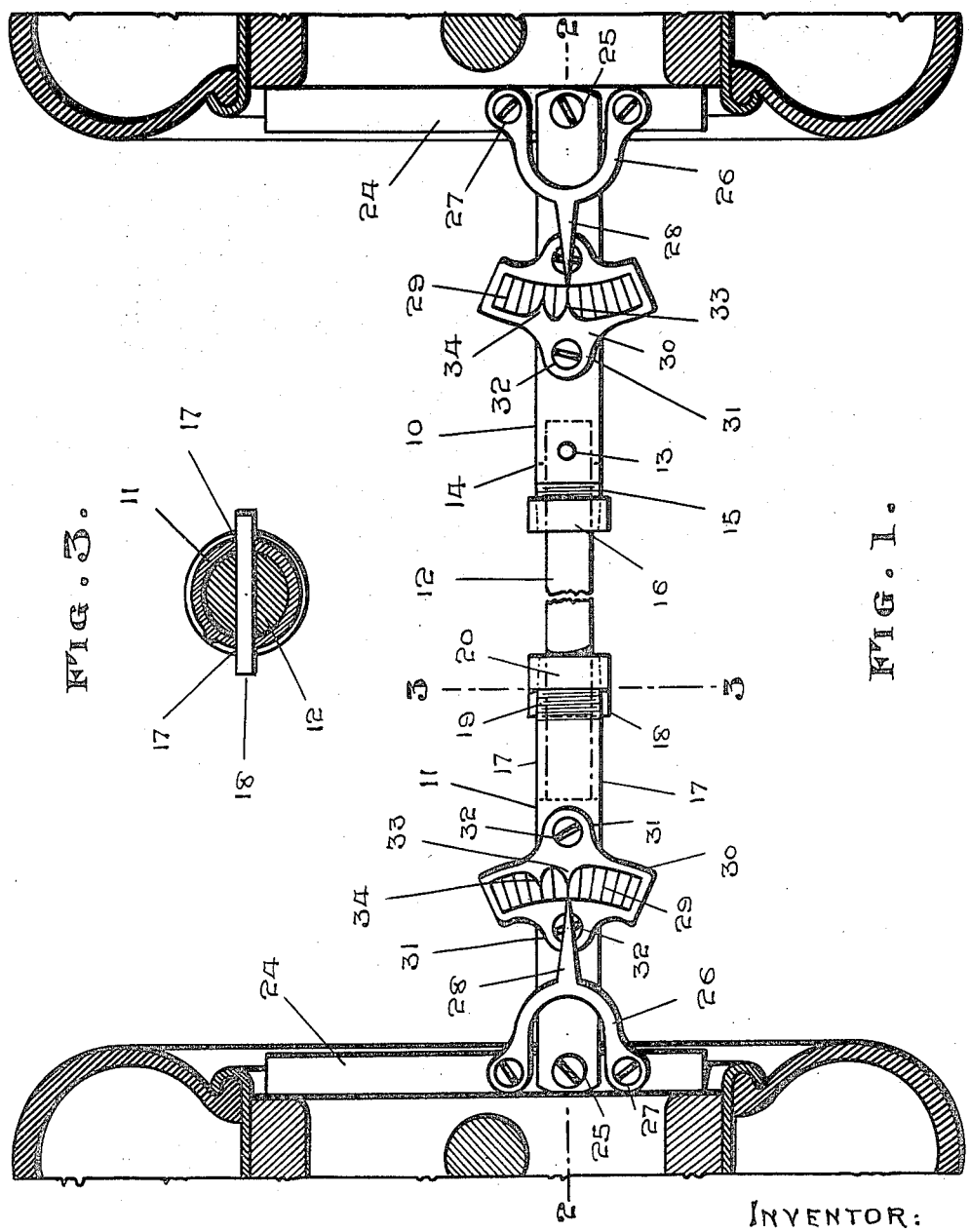

Patented Nov. 25, 1924.

1,516,549

UNITED STATES PATENT OFFICE.

ANTON I. SANDBO, OF ROCK ISLAND, ILLINOIS.

WHEEL-ALIGNMENT INDICATOR.

Application filed August 19, 1921. Serial No. 493,635.

*To all whom it may concern:*

Be it known that I, ANTON I. SANDBO, a citizen of the United States, residing at Rock Island, in the county of Rock Island and State of Illinois, have invented certain new and useful Improvements in Wheel-Alignment Indicators; and I do hereby declare the following to be a full, clear, and exact description of the invention, such as will enable others skilled in the art to which it appertains to make and use the same.

The present invention relates to a device for application to the wheels of automobiles and other vehicles for indicating the alignment or planes thereof, in order that the wheels can be alined or properly positioned if they are not true, so as to avoid excessive wear on the tires and other parts of the machine.

It is the object of the invention to provide such a wheel position indicator of novel and improved construction, for the convenient, practical and efficient indication of the positions of the wheels.

Another object is the provision of such a device which when applied to the wheels will maintain itself in position and also adjust itself to the wheels when they are being trued or alined.

A further object is the provision of such a device which can be used for indicating the positions of the wheels with respect to both vertical and horizontal lines.

A still further object is the construction of such a device in a simple and inexpensive manner, and with a novel arrangement of the component elements.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:

Figure 1 is a plan view of the indicator in position between a pair of wheels in a horizontal plane for indicating the positions of the wheels with reference to horizontal lines, portions being broken away.

Fig. 2 is a longitudinal section on the line 2—2 of Fig. 1, portions being shown in elevation.

Fig. 3 is an enlarged cross section on the line 3—3 of Fig. 1.

Fig. 4 is a reduced elevation showing the device between a pair of front wheels of an automobile in a vertical plane to indicate the positions of the wheels with reference to vertical lines.

In carrying out the invention, there is provided an extensible member composed of the tubular end sections 10 and 11 and the intermediate section or rod 12 having its terminals fitted within the adjacent end portions of the tubular sections. One terminal of the rod 12 is secured within the section 10 by means of a rivet 13 or other securing element extending through said rod and section, and in order to firmly hold said rod and section in alignment, the inner end portion of the section 10 is slotted or split, as at 14, and has external tapered screw-threads 15 on which a nut 16 is threaded, whereby the nut in being tightened will compress the end portion of the section 10 and tightly clamp it on the rod 12.

The rod 12 and section 11 fit together slidably, for the elongation and shortening of the extensible member. The section 11 has opposite longitudinal slots 17 extending from its inner end, and a transverse or diametrical feather 18 extends through the rod 12 and is slidable in the slots 17, whereby to prevent relative turning movement of the sections 10 and 11 around their common axis. The slots 17 also enable the inner end portion of the section 11 to be compressed, said section having external tapered screw threads 19 on the inner end portion thereof on which a nut 20 is threaded, to compress the inner end of the section 11 on the rod 12 similar to section 10, when it is desired to clamp the section 11 in place on the rod. The nut 20 can also be adjusted to provide a snug fit between the section 11 and rod 12.

The extensible member is yieldingly elongated by means of a coiled expansion spring 21 located within the tubular section 11 and confined between the rod 12 and a diametrical rivet or pin 22 engaged through the section 11, so that the spring in expanding will tend to separate the rod 12 and section 11. The feather 18 contacting with the nut 20, will limit the separation of said parts.

The opposite terminals of the sections 10 and 11 are bifurcated or slotted, as at 23, and receive blades or bars 24 which are pivoted within the end portions of the sections 10 and 11 by means of pivot bolts 25, or the like, extending through said sections and blades. The pivots are preferably located nearer the corresponding ends of the blades 24 than the opposite ends, so that the extensible member can be located nearer to the observer, and for the additional purpose of obtaining a more accurate indication than if the pivots were at the center of the blades.

The angles between the blades 24 and extensible member are indicated by means of pointers on graduated scales. For this purpose, arched members 26 have their ends secured, as at 27, to the blades 24 astride the sections 10 and 11, and said arched members have pointers 28 projecting from the intermediate portions thereof away from the pivots 25 to cooperate with arcuate scales of graduations 29 provided on the plates 30 carried by the extensible member. The plates 30, as shown, have opposite ears 31 secured by screws 32 or otherwise to the sections 10 and 11. The pointers move with the blades and the pointers 28 will indicate on the graduations the angles of the blades 24 and wheels with reference to the extensible member. Each scale of graduations has a prominent or major graduation or mark 33 and another prominent or major graduation or mark 34 to indicate the true positions of the wheels, as will hereinafter more fully appear.

Supposing that it is desired to test a pair of wheels for longitudinal alignment with reference to horizontal longitudinal lines, then the device is applied to the wheels as shown in Fig. 1. The extensible member is contracted so that the device can be readily inserted between the wheels, and the spring 21 will then separate the sections of said member, the blades or bars 24 being positioned to bear at their outer edges against the fellies or other suitable surfaces of the wheels at the inner sides thereof. The device is preferably applied to the wheels below the axle, with the device disposed in a horizontal plane. The blades or bars 24 will thus assume the same positions as the wheels with reference to the horizontal lines, and if the wheels are in proper alignment, the pointers 28 will register with the graduations or marks 33. Otherwise, if the pointers 28 do not register with such graduations 33, the wheels are not properly alined, and adjustments can be made while the device is in position, inasmuch as the extensible member will adjust itself lengthwise as the wheels are adjusted, and the blades or members 24 can also adjust themselves with the wheels, the device maintaining itself in position as well as being adjusted with the wheels. When the wheels are adjusted to bring the pointers 28 in registration with the marks 33 then the wheels are parallel or in proper "tow line" position. By placing the device between the wheels in a vertical plane, test can be made for determining whether or not the wheels are in proper position with reference to vertical lines. If the wheels are supposed to be in vertical planes, then the marks or graduations 33 are used, whereas when the front wheels are inclined apart, as seen in Fig. 4, the graduations or marks 34 are used for the registration of the pointers 28 to indicate the proper inclined positions of the wheels.

Having thus described the invention, what is claimed as new is:

1. A wheel position indicator comprising an extensible member including a tubular section and a rod slidably entering one end portion of said section, blades connected to the opposite ends of said member to assume different angles with reference to said member, means between the blades and member for indicating the angles of said blades with reference to said member, said end portion of the tubular section having a slot, a feather carried by said rod working in said slot to prevent relative rotation of the section and rod, and means on the slotted portion of said section for contracting it to embrace the rod.

2. A wheel position indicator comprising an extensible member including tubular end sections and an intermediate rod telescoped into the adjacent end portions of said sections, blades connected to the opposite ends of said end sections to assume different angles with reference to said member, means between said blades and member for indicating the angles of said blades with reference to said member, said rod and one end section being slidable relatively to one another, means for securing said end section and rod together to prevent their relative sliding movement and a spring in said end section bearing against said rod to separate them when the securing means is loosened.

In testimony whereof I have signed my name to this specification in the presence of two subscribing witnesses.

ANTON I. SANDBO.

Witnesses:
JACOB T. BERTELSEN,
FRITZ OHLHORST.